United States Patent [19]
Gilmore et al.

[11] 3,961,546
[45] June 8, 1976

[54] DIGITAL AUTOMATIC TRANSMISSION CONTROL

[75] Inventors: Thomas P. Gilmore, Wauwatosa; David L. Moore, Brookfield, both of Wis.

[73] Assignee: Allis-Chalmers Corporation, Milwaukee, Wis.

[22] Filed: Sept. 17, 1974

[21] Appl. No.: 506,793

[52] U.S. Cl. ................................................ 74/866
[51] Int. Cl.² ........................................ B60K 21/00
[58] Field of Search ....................... 74/866, 867, 869

[56] References Cited
UNITED STATES PATENTS

| | | |
|---|---|---|
| 3,724,293 | 4/1973 | Wakamatsu et al. ................. 74/866 |
| 3,727,488 | 4/1973 | Wakamatsu et al. ................. 74/866 |
| 3,805,640 | 4/1974 | Schneider et al. ................. 74/866 X |

*Primary Examiner*—Benjamin W. Wyche
*Assistant Examiner*—Frank H. McKenzie, Jr.
*Attorney, Agent, or Firm*—Lee H. Kaiser

[57] ABSTRACT

A digital automatic control for a change-speed transmission receives digitally coded electrical signals from a gear selector and automatically shifts transmission gears, up to the maximum speed selected, to maintain transmission speed within a range which will assure the most efficient use of available engine power.

37 Claims, 2 Drawing Figures

DIGITAL AUTOMATIC TRANSMISSION CONTROL

This invention relates to change-speed transmissions and in particular to an electronic control for automatically shifting gears of an electromagnetically operated changespeed transmission.

It is an object of the invention to provide a digital electronic control for automatically shifting gears of an electromagnetically operated change-speed within a range that assures optimum power output from the engine.

It is a further object of the invention to provide a digital electronic control for automatically shifting an electromagnetically operated transmission which is completely compatible with the existing manual control and requires no revision in the transmission for installation.

Another object of the invention is to provide such a digital electronic automatic transmission control which is compatible with and adapted to selectively energize electrical solenoids which couple the respective gears of known electromagnetically operated change-speed transmissions.

A further object of the invention is to provide a digital electronic control for automatically shifting the gears of a change-speed transmission which permits the operator to select the maximum speed desired and does all the shifting above first speed automatically as a function of input shaft speed up to the maximum speed selected.

Still another object is to provide such an improved digital electronic control for shifting a change-speed transmission wherein the operator cannot force the transmission to shift up or down and which prevents engine overspeeds that might otherwise be caused by improper downshifts.

A still further object is to provide an improved digital control for shifting a change-speed transmission which, if the vehicle is abruptly halted, shifts directly to neutral and then to first, thereby eliminating the necessity of downshifting through each transmission speed to reach first.

Another object is to provide such an improved digital electronic transmission control which, in the event of tachometer failure, will prevent shifting up or down until the vehicle is stopped and will then shift to neutral and stay in neutral.

SUMMARY OF THE INVENTION

The electronic control of the invention responds to digitally coded electrical signals from a gear selector indicative of desired speed to automatically shift gears of a known electromagnetically operated change-speed transmission which is adapted to engage respective gears to provide different speed ratio power paths between input and output shafts in accordance with digitally coded signals applied to transmission inputs. The digital electronic control has a tachometer for sensing torque converter shaft speed and shifts the transmission up when the speed is above a high speed limit and downshifts when it drops below a low speed limit. An up/down counter is adapted to be incremented and decremented respectively upon receipt of an up and a down signal and to proceed one count when a shift pulse is applied thereto, and means including a decoder and power amplifier for driving the transmission solenoids are coupled to the output of the counter and apply digitally coded signals to the transmission inputs so that it engages the gear corresponding to the stored count. A high speed sensor normally applies a down signal to the counter and operates when the tachometer pulse frequency reaches the high speed limit to apply an up signal to the counter and to start a timer. After being triggered for a time delay to insure that a shift has been completed before allowing another, timer times out and applies a shift pulse to the counter which increments the counter and thereby shifts the transmission up. If the input shaft speed is still above the high speed limit, the high speed sensor will again start the timer and increment the counter to accomplish another up shift. Upshifting will continue until the maximum speed set on the gear selector is reached or engine speed drops. Shift comparison logic means compare the speed set on the gear selector, as indicated by the coded output signal therefrom, to the output of the control as represented by the count stored in the counter and disable the high speed sensor to prevent an up shift when the selected speed is equal to or less than the stored count. Thus the control will not shift to a higher speed than set by the operator. A down speed sensor operates when the input shaft speed is below the low speed limit and starts the timer which applies a shift pulse to the counter after it times out to decrement the counter and thereby down shift the transmission. If the gear selector lever is moved to neutral when the transmission is in a gear above first, the control will only down shift when the torque connector shift speed is below the low speed limit and the timer is started for each down shift.

DESCRIPTION OF THE DRAWINGS

These and other objects and advantages of the invention will be more readily apparent from the following detailed description when considered with the accompanying drawings wherein.

GENERAL DESCRIPTION

Figure 1:
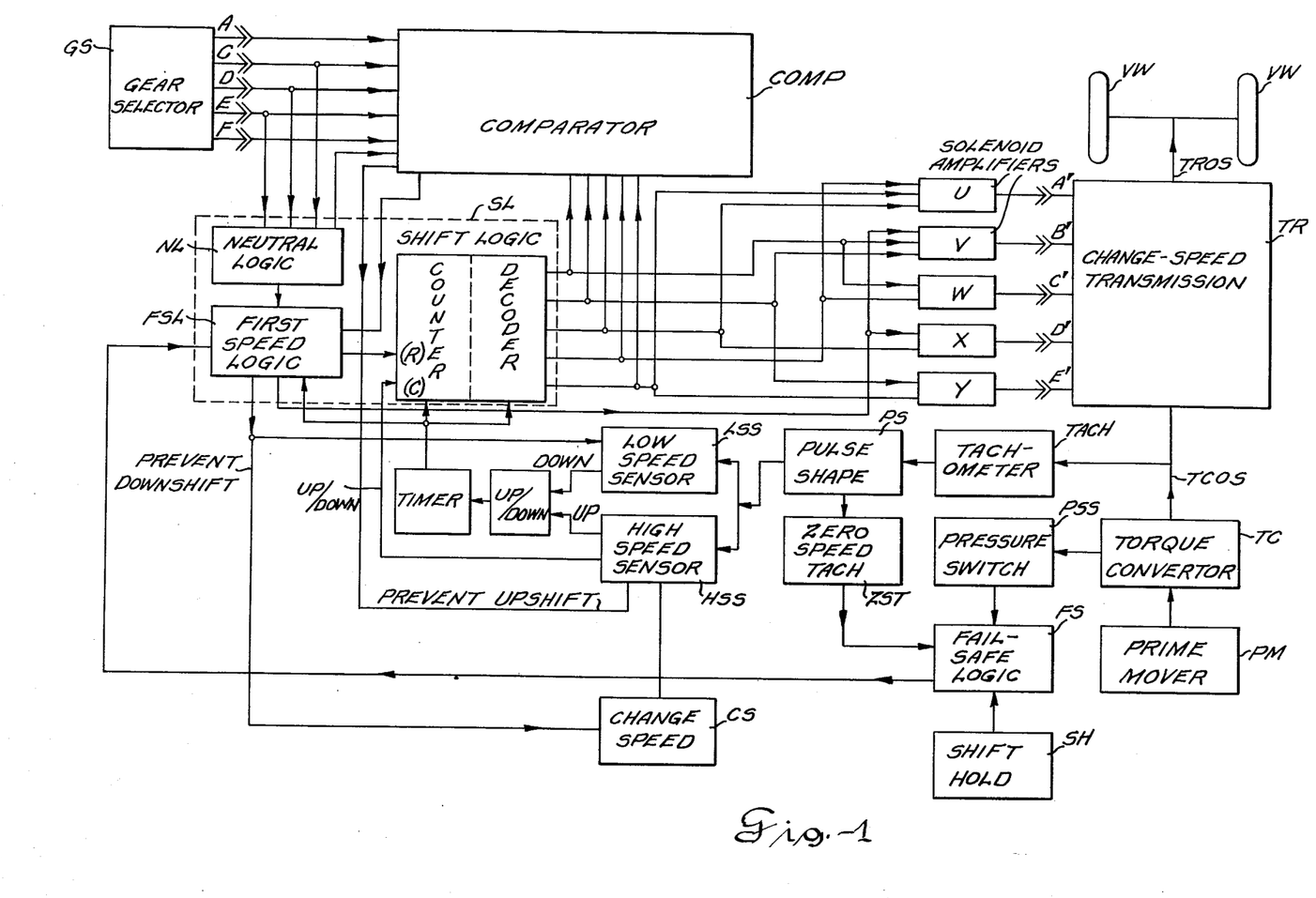
FIG. 1 is a block diagram schematic representation of a preferred embodiment of the invention incorporated in an operator-controlled earth moving scraper.

Referring to the drawing, FIG. 1 is a schematic block diagram of the invention as embodied in an operator-controlled vehicle such as an earth moving scraper powered by a prime mover PM such as a diesel engine mounted on the vehicle and which drives a torque converter TC. The output shaft TCOS of the torque converter TC is coupled to the input of a known electromagnetically operated change-speed transmission TR having different speed ratio power paths between its input and output selected when its transmission gears are respectively engaged, or coupled. The output shaft TROS of transmission TR drives the wheels VW of the vehicle. The respective gears of transmission TR are coupled by the operation of transmission solenoids (not shown). Each transmission speed requires two solenoids to be operated. Each gear 1-6 of the transmission TR is engaged, or coupled, when two of the leads A', B', C', D', E', F' to the respective solenoids are energized as shown in Table 1.

TABLE 1

| SOLENOID AMPLIFIERS ENERGIZED | | | | | ENGAGED GEAR | OUTPUT LEADS ENERGIZED (TRANSMISSION SOLENOIDS) | | | | | |
|---|---|---|---|---|---|---|---|---|---|---|---|
| U | V | W | X | Y | | A' | B' | C' | D' | E' | F' |
|   |   |   |   |   | Neutral |   |   |   |   |   |   |
|   | X |   |   | X | 1 |   | X |   | X |   |   |
|   | X | X |   |   | 2 |   | X | X |   |   |   |
|   | X |   | X |   | 3 |   | X |   |   |   | X |
| X |   |   |   | X | 4 | X |   |   | X |   |   |
| X | X |   |   |   | 5 | X | X |   |   |   |   |
| X |   |   | X |   | 6 | X |   |   |   |   | X |
|   | X |   |   |   | Reverse |   | X |   |   |   | X |

Solenoid amplifiers U, V, W, X and Y amplify logic signals provided by the shift logic SL (described hereinafter) to a level (appearing at the output connector pins A'–F') sufficiently high to drive the solenoids of transmission TR as shown in Table 1. For example, turning on solenoid amplifiers V and W provides voltages on output connector pins B' and C' and thus results in energizing of the corresponding transmission solenoids B' and C' (not shown) and consequent coupling of the second transmission gear.

The digital electronic automatic transmission control operates in a manner somewhat analogous to the automatic transmission of a car. However, six speeds are available. The operator sets a gear selector GS, termed a "shift quadrant" to select the maximum speed desired, first through sixth, and the control of the invention then does all the shifting up to the maximum speed selected. The gear selector, or shift quadrant GS is shown only in block form and provides digitally coded electrical signals A, C, D, E, F shown in Table 2 indicative of the highest speed ratio transmission gear selected by the operator.

TABLE 2

| TRANSMISSION GEAR DESIRED | GEAR SELECTOR OUTPUT | | | | | |
|---|---|---|---|---|---|---|
|   | A | B* | C | D | E | F |
| Neutral | 0 | 1 | 0 | 0 | 0 | 0 |
| 1 | 0 | 1 | 0 | 1 | 0 | 0 |
| 2 | 0 | 1 | 1 | 0 | 0 | 0 |
| 3 | 0 | 1 | 0 | 0 | 1 | 0 |
| 4 | 1 | 0 | 0 | 1 | 0 | 0 |
| 5 | 1 | 0 | 1 | 0 | 0 | 0 |
| 6 | 1 | 0 | 0 | 0 | 1 | 0 |
| Reverse | 0 | 1 | 0 | 0 | 0 | 1 |

*Artificially generated in control.

Shift quadrant GS provides a digitally encoded output on two input connector pins to the control for all transmission speeds except neutral. However, input connector pin B is not used since (it will be noted from FIG. 1) that either, but not both, input signal A or B is always present. Consequently, one input signal A or B is redundant, and input signal B is derived by generating the inverse of signal A at the collector of a NPN transistor Q29 (see FIG. 2) whose emitter is grounded. Input signal A is applied through a resistor R4 to the base of transistor Q29 so that input signal B is approximately ground, or logic 0 voltage, when input signal A is present and forward biases the base of transistor Q29 to turn it on. Signal B is the collector voltage, or logic 1, when signal A is absent so Q29 is turned off.

An input resistor network comprising resistances R1 through R10 and R70 (see FIG. 2) interfaces shift quadrant GS with the neutral logic NL and with the shift comparison logic, or comparator COMP which compares the setting of shift quadrant GS with the output of the control as represented by the count stored in the up/down COUNTER.

It will be noted that the digitally coded signals from shift quadrant GS on input leads A–F for each selected speed are the same as the digitally coded output signals on corresponding output connector pins A'–F', and it will thus be appreciated that shift quadrant GS can directly control speed change transmission TR (without automatic gear shifting accomplished by the present invention) if the output connector from shift quadrant GS is plugged into the input connector for transmission TR so that correspondingly lettered leads A and A', B and B', etc., are electrically connected.

Shift Logic

The shift logic SL controls automatic shifting from neutral through sixth gear. The shift logic SL includes the neutral logic NL (logic gates 1A, 4B, 7A), the first speed logic FL (logic gates 7A, 8B, 8A, 7C, 6A), a binary up/down COUNTER, and a DECODER (logic gates 9A, 9B, 9C, 10A, 10B, 11B, 11C) which converts the binary output of the COUNTER TO decimal. The decimal output of the DECODER, 0 through 6, represents neutral and the six speeds of transmission TR.

Neutral Logic (Gates 1A, 7A, 4B)

When shift quadrant GS is in neutral, the neutral logic NL shown in block form in FIG. 1 is responsive to the digitally coded input signals A–F to indicate when shift quadrant GS is in neutral. The neutral logic NL operates the first speed logic FSL to inactivate all the solenoid amplifiers U–Y so that none of the gears of transmission TR are coupled and to also provide logic 1 signal on a lead to the RESET input of the COUNTER to disable the counter and prevent it from proceeding forward from zero. When the output of the COUNTER is binary zero, logic 1 signals will exist on all outputs from the DECODER, thereby turning off all solenoid amplifiers U–Y. When shift quadrant GS is in neutral and the output of the control is in second through sixth, the neutral logic NL actuates the shift comparison logic COMP to provide logic 1 voltage on a PREVENT UPSHIFT lead to disable a high speed sensor HSS and thereby prevent shifting the transmission TR to a higher speed.

First Speed Logic

When the operator shifts the gear selector GS from neutral to first gear or higher (assuming the machine is at standstill), the neutral logic NL actuates the first speed logic FSL to (a) remove logic 1 from the RESET input to the COUNTER so that it can proceed forward, (b) provide logic 0 input to solenoid amplifiers V and X which turn on to apply energizing signals on output lead connector pins B' and D' and operate the corresponding transmission solenoids to couple the first gear of transmission TR, and (c) provide logic 1 on a PREVENT DOWNSHIFT lead to low speed sensor LSS to prevent any downshifts. The neutral logic NL also actuates the shift comparison logic COMP to apply logic 0 to the PREVENT UPSHIFT lead to thereby permit the control to shift up.

All subsequent shifting of transmission gears 2 through 6 is controlled by a high speed sensor HSS and by a low speed sensor LSS and is primarily accomplished by the up/down COUNTER which provides a binary coded output. When the speed of the torque converter output shaft TCOS is above a predetermined high speed setting to thereby call for an upshift, the high speed sensor HSS applies logic 1 on the UP/DOWN lead to the COUNTER so that it can proceed forward and also applies logic 1 on the UP lead to the UP/DOWN circuit. In response to logic 1 on the UP lead the UP/DOWN circuit starts a time-delay TIMER which requires that the triggering signal from the speed sensor be present for one second before a shift pulse is generated to thereby prevent noise and sudden speed changes from causing erratic shifting. When the TIMER times out, it applies a logic 1 shift pulse to the CLOCK input of the COUNTER to increment it one count, and the DECODER converts the binary output of the COUNTER to decimal and turns on transmission amplifiers V and W to thereby energize output leads B' and C' and couple the second gear of transmission TR as shown in Table 2. The shift pulse from the TIMER is applied to logic gates of the DECODER and also to the first speed logic FSL and forces all gates to logic 1 during a gear shift. The shift pulse is preferably 40 milliseconds wide and forces all gates to logic 1 to thereby release all transmission solenoids during the gear shift in order to prevent overlap between speed ranges. When the decimal output of the DECODER calls for coupling of the second transmission gear, the shift comparison logic COMP actuates the first speed logic FSL to disable solenoid amplifier X and thereby disengage the first gear.

The control of the invention thus shifts transmission TR up, i.e., to the next higher speed ratio, when the speed of the torque converter output shaft TCOS is above a predetermined high speed setting (for example, 1725 rpm) and shifts the transmission down, i.e., to the succeeding lower speed ratio when the speed of torque converter shaft TCOS drops below a predetermined low speed setting (for example, 100 rpm).

The setting of the gear selector GS establishes the upper gear limit, i.e., the control of the invention will upshift to a maximum set by the gear selector GS.

A tachometer TACH coupled to the torque converter output shaft TCOS provides signals of the frequency of shaft speed which are converted to rectangular pulses of predetermined width in a pulse shaping circuit PS and fed to high speed sensor HSS and to low speed sensor LSS. When high speed sensor HSS detects that torque converter output shaft speed is above the high speed setting, it provides a logic 1 "up" signal on the UP/DOWN lead to the COUNTER and also applies a signal on an UP lead to the UP/DOWN circuit to start the TIMER. After a one second time delay, the TIMER applies a pulse to the CLOCK input of the COUNTER which proceeds forward one count. The DECODER converts the binary output of the COUNTER to decimal and turns on solenoid amplifiers corresponding to the next higher speed ratio gear (e.g., solenoid amplifiers V and W for the second gear). The comparator COMP senses the decimal output of the DECODER and operates the first speed logic FSL to turn off the solenoid amplifiers for the preceding gear. If the torque converter output shaft speed is still above the high speed setting, the TIMER will again be started and, after another time delay, will increment the COUNTER another binary count and operate the solenoid amplifiers for the succeeding gear, for example, solenoid amplifiers V and Y associated with the third gear. Such upshifting will continue until the setting of gear selector GS is reached or the speed of torque converter output shaft TCOS drops below the high speed setting.

When the COUNTER proceeds to binary 2 corresponding to the second gear, the shift comparison logic COMP is responsive to the output of the DECODER to apply a signal to the first speed logic FSL which operates the change speed circuit CS to change the high speed setting at which an upshift can occur. Thus the control upshifts at a lower speed when it is operating in the torque converter mode in first gear than when a transmission gear 2 through 6 is engaged.

Shift Comparison Logic

The shift comparison logic COMP compares the output of the shift quadrant GS to output of the control as represented by the DECODER. If the shift quadrant GS is asking for a lower speed than the DECODER output provides, the comparator COMP provides a signal on the PREVENT UPSHIFT lead to prevent further upshifting, thereby preventing the control from shifting up past the gear selector setting.

Comparator COMP receives both the digitally encoded signals on the shift quadrant output leads A, C, D, E, F and the decimal output of the DECODER. When the two are identical, comparator COMP provides logic 1 on the PREVENT UPSHIFT lead to disable the high speed sensor which in response thereto provides logic 0 "down" signal on the UP/DOWN lead to thereby prevent the COUNTER from proceeding forward. When the gear selector setting is the same as (or less than) the stored count as indicated by the DECODER, the high speed sensor maintains a logic 0 down signal on the UP/DOWN lead which permits only decrementing of the counter, and the control permits only downshifting.

A downshift is accomplished in a manner similar to an upshift except that the COUNTER is decremented rather than counting forward. The low speed sensor LSS applies logic 1 on a DOWN lead to trigger the UP/DOWN control to start the TIMER when it detects that the torque converter output shaft speed has dropped below the predetermined low speed setting. Logic 0 from the high speed sensor HSS exists under such condition on the UP/DOWN input to the COUNTER. When the TIMER times out, it applies a shift pulse to the CLOCK input of the COUNTER, thereby causing the COUNTER to count backward. The DECODER will convert the binary output of the COUNTER to decimal and enable the solenoid amplifiers for the succeeding lower speed ratio gear.

If shift quadrant is actuated to a setting lower than that corresponding to the engaged gear, the signal from the comparator COMP on the PREVENT UPSHIFT lead will prevent shifting up under any condition, and the control will shift down in the normal manner through each succeeding lower speed gear position each time the torque converter output shift speed falls below the low speed setting. If the gear selector GS is moved to neutral and the stored count output has resulted in engagement of a gear 2 through 6, the control will downshift from gear to gear each time the torque converter output shaft speed drops below the low speed setting.

DETAILED DESCRIPTION

The automatic shifting control has six speeds available and functions in a manner analagous to the automatic transmission of the car in that the operator selects the maximum speed desired, first through sixth, on shift quadrant GS, and shifting of transmission TR thereafter is controlled by the speed of torque converter TC. Overspeed of prime mover PM that might be caused by improper downshifts is prevented since shifting is controlled only by torque converter speed, and the operator cannot force the control to shift up or down. Shift quadrant GS acts as an upper limit since the control will not shift to a higher speed than that set by the operator. Further, if the operator moves the shift lever of shift quadrant GS to a speed less than that at which the transmission TR is operating, only down shifts will occur in response to the outputs of the high speed sensor HSS or the low speed sensor LSS until the operating speed of transmission TR is less than the shift lever set point on shift quadrant GS. Thereafter upshifts and downshifts will occur with the new upper speed limit set on shift quadrant GS.

Figure 2:
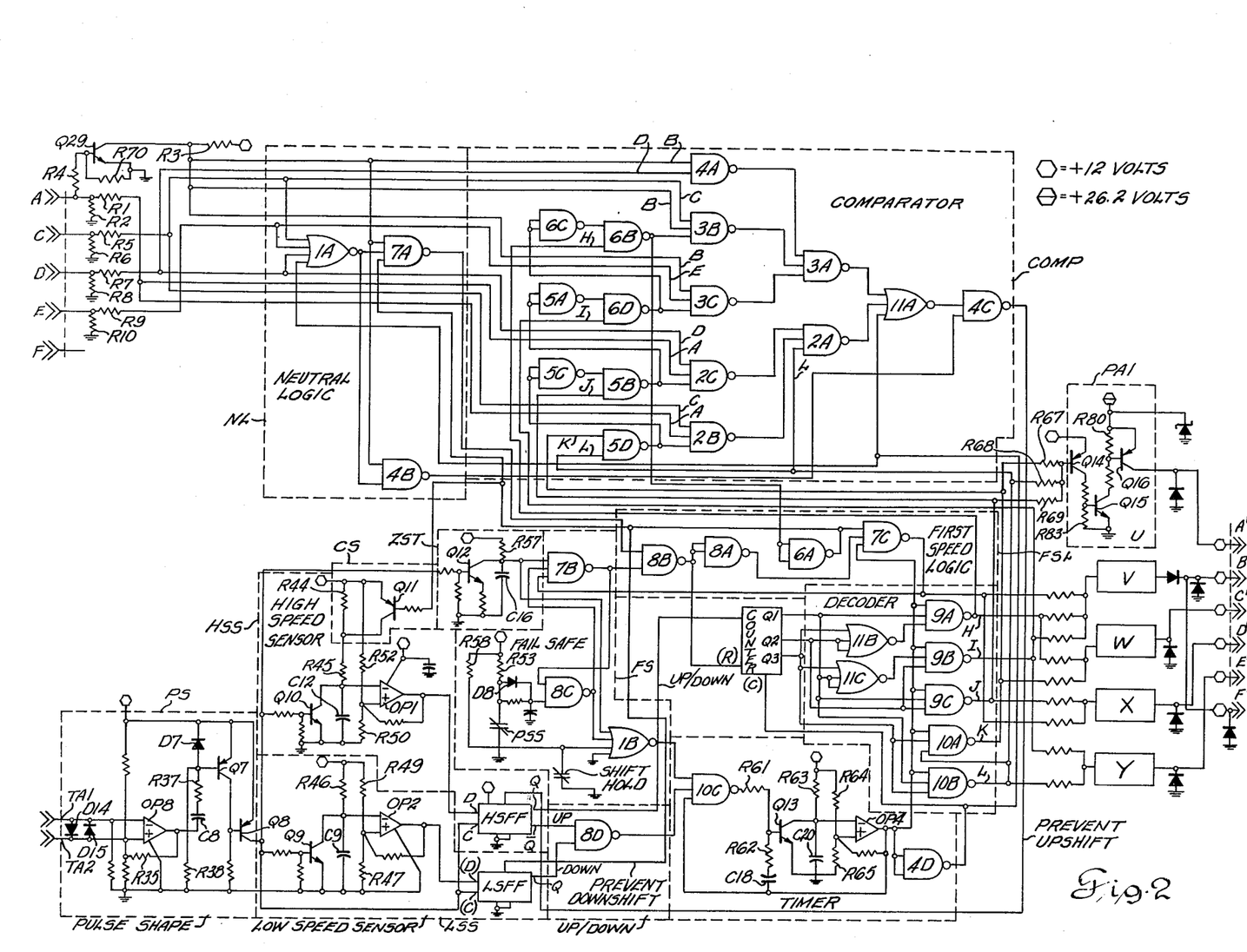
FIG. 2 is a schematic circuit diagram of the embodiment shown in FIG. 1.

The output leads A, C, D, E, F of shift quadrant GS are connected through a multi-pin input connector to logic gates 4A, 3B, 3C, 2C and 2B of the shift comparison logic COMP and also to logic gates 1A, 7B and 4B of the neutral logic NL. Input signal B is the inverse of input signal A and is artificially generated at the collector of transistor Q29, as described hereinbefore.

Neutral Logic (Gates 1A, 4B, 7A)

In order to start the vehicle, shift quadrant GS must be in neutral, thereby providing logic 1 on the B input lead and logic 0 on input leads A and C–F, as shown in Table 2. Neutral position is sensed by detecting that input leads C, D and E are not energized when shift quadrant GS is set to neutral or reverse. NOR gate 1A of the neutral logic has logic 0 inputs from the C, D and E input leads and from gate 4D of the TIMER so that its output is logic 1 when shift quadrant GS is in neutral. The logic 1 from gate 1A is applied to one input of NAND gate 4B whose other input is logic 1 from input lead B so that its output is logic 0. The logic 0 from gate 4B indicates to the comparator COMP that the shift quadrant GS is in neutral and is applied to an input to gate 4C to thereby provide logic 1 on the PREVENT UPSHIFT lead to prevent an upshift when shift quadrant GS is in neutral and the transmission is in second through sixth.

The logic 1 from gate 1A is also applied to an input to NAND gate 7A which has another input that receives the artificially generated logic 1 signal B. A third input to gate 7A is from NOT gate 6A which provides logic 1 when zero count is stored in the COUNTER and the control is in neutral or first. The resulting logic 0 from gate 7A is applied to an input of first speed logic NAND gate 8B which provides logic 1 output that is coupled to the RESET input of the COUNTER, thereby providing logic 0 on the Q1, Q2 and Q3 outputs of the COUNTER and preventing it from counting when shift quadrant GS is in neutral and the control is also in neutral. Consequently, logic 1 will exist on DECODER gates 9A, 9B, 9C, 10A, 10B (and on gate 7C) so that all solenoid amplifiers U–Y are disabled. The logic 1 output of gate 8B also results in logic 0 output of NOT gate 8A and consequent logic 1 output from first speed coupling gate 7C of the first speed logic. The logic 1 from gate 7C disables solenoid amplifiers V and X to maintain transmission TR in neutral. The output of gate 7A indicates when both shift quadrant GS and the transmission TR are in neutral and is used to shift the control to neutral when desired.

First Speed Logic (Gates 7A, 8B, 8A, 6A, 7C)

When the operator actuates the shift quadrant lever to first (assuming the machine is at standstill), input lead D becomes logic 0 so the output of NOR gate 1A goes to logic 0, NAND gate 7A goes to logic 1 and gate 4B goes to logic 1. In response to the logic 1 from gate 7A, first speed logic gate 8B provides logic 0 to the RESET input of the COUNTER so that it can proceed forward. The logic 0 from gate 8B also results in logic 1 from gate 8A and consequent logic 0 from first speed coupling gate 7C which is applied to the inputs to solenoid amplifiers V and X to enable them. Solenoid amplifiers V and X then energize output leads B' and E' respectively to operate the corresponding solenoids of transmission TR and thereby couple the first gear. The logic 1 from gate 4B is applied to COMPARATOR gate 4C and results in logic 0 output therefrom on the PREVENT UPSHIFT lead to thereby permit the control to shift up if the shift quadrant GS is calling for second or higher.

Counter

The shift logic SL may include a four-bit COUNTER and a "1-of-6" DECODER. The COUNTER is shown in block form in FIG. 2 and may be of the type available commercially from Motorola Corporation under the type designation MC 14510 which provides a binary coded decimal BCD output on three output leads Q1, Q2, and Q3. The COUNTER is incremented one count when logic 1 from a flip-flop HSFF of the high speed sensor HSS exists on an UP/DOWN input lead and a logic 1 shift pulse appears on its CLOCK input from the TIMER. Zero count is stored in the COUNTER when transmission TR is in neutral and first gear.

Decoder

The BCD-coded output from the COUNTER on leads Q1, Q2, and Q3 are applied to a 1-of-6 DECODER comprising logic gates 11B, 11C, 9A, 9B, 9C, 10A, and 10B. The conditions of the logic gates of the DECODER are shown in Table 3 for each of the BCD outputs from the COUNTER.

TABLE 3

| ENGAGED GEAR | COUNTER OUTPUT | | | DECODER GATES | | | | | | |
|---|---|---|---|---|---|---|---|---|---|---|
| | Q3 | Q2 | Q1 | 11B | 11C | 9A | 9B | 9C | 10A | 10B |
| Neutral | 0 | 0 | 0 | 11 | 1 | 1 | 1 | 1 | 1 | 1 |
| 1 | 0 | 0 | 0 | 1 | 1 | 1 | 1 | 1 | 1 | 1 |
| 2 | 0 | 0 | 1 | 1 | 0 | 0 | 1 | 1 | 1 | 1 |
| 3 | 0 | 1 | 0 | 0 | 1 | 1 | 0 | 1 | 1 | 1 |
| 4 | 0 | 1 | 1 | 0 | 0 | 1 | 1 | 0 | 1 | 1 |
| 5 | 1 | 0 | 0 | 0 | 0 | 1 | 1 | 1 | 0 | 1 |
| 6 | 1 | 0 | 1 | 0 | 0 | 1 | 1 | 1 | 1 | 0 |

Shifting to neutral and to first gear are not controlled by the COUNTER and DECODER but rather are controlled by the neutral logic NL and first speed logic FSL when the COUNTER output is 000. The output of DECODER gates 9A, 9B, 9C, 10A and 10B are coupled respectively to solenoid amplifiers U, V, W, X and Y as shown in the following Table 4:

TABLE 4

| DECODER GATE | SOLENOID AMPLIFIER | | | | |
|---|---|---|---|---|---|
| | U | V | W | X | Y |
| 9A | | X | X | | |
| 9B | | X | | | X |
| 9C | X | | | X | |
| 10A | X | | X | | |
| 10B | X | | | | X |

Each amplifier is activated upon receipt of a logic 0 input signal from the corresponding DECODER gate and is inactivated when logic 1 input is applied thereto by the DECODER gate. It will be noted from Table 3 that DECODER gates 9A, 9B, 9C, 10A, and 10B provide logic 0 outputs respectively when the COUNTER has proceeded to binary BCD codes on leads Q1, Q2, Q3 corresponding to decimal numbers 1, 2, 3, 4, and 5 and also that these DECODER gates provide logic 1 outputs in all other positions of the COUNTER.

Solenoid Amplifiers

Solenoid amplifiers U, V, W, X and Y amplify the logic signals derived from DECODER gates 9A, 9B, 9C, 10A, 10B and by first speed logic gate 7C to a level adequate to drive the solenoids of transmission TR. Each transmission speed requires the operation of two solenoids and thus necessitates the energization of two solenoid amplifiers for each speed, as shown in Table 1. The solenoid amplifiers receive turn-on signals through OR gates each of which comprises a plurality of input resistors. Amplifier U is shown within the dotted line rectangle in FIG. 2, and resistors R67, R68, and R69 comprise an OR input circuit which turns on amplifier U if logic 0 voltage is applied to the input of R67 by DECODER gate 10A or if logic 0 is applied to the input of R68 by DECODER gate 10B or if logic 0 is applied to the input of R69 by DECODER gate 9C. A logic 0 signal applied to resistor R69 by gate 9C forward biases the base of PNP transistor Q14 and turns it on. Conduction by Q14 causes current flow through its collector resistor R83 and develops a voltage which forward biases NPN transistor Q15 and turns it on. Conduction by Q15 causes a voltage drop across its collector resistor R80 which lowers the voltage on the base of PNP transistor Q16 and turns it on to thereby apply power to output lead A' to the transmission.

Shifting above first speed is controlled by high speed sensor HSS and low speed sensor LSS. If the setting of shift quadrant GS is second speed or higher and torque converter shaft speed is above the high speed setting high, speed sensor HSS will apply logic 1 on the UP/DOWN lead to the COUNTER and also start the TIMER. When the TIMER times out, it applies a logic 1 shift pulse to the CLOCK input of the COUNTER which increments to binary 1 and provides logic 1 on its Q1 output. The DECODER E converts the binary 1 output from the COUNTER to decimal by providing logic 0 output from gate 9A which enables solenoid amplifiers V and W. Turning solenoid amplifiers V and W on energizes the B' and C' output leads to operate the corresponding gear solenoids and thereby couple the second gear of transmission TR. The logic 0 output from DECODER gate 9A is applied to lead H and thus is an input of comparator gate 6B which changes its output to logic 1. The logic 1 output from gate 6B provides logic 0 output from NOT gate 6A which is applied to one input to gate 7C to change its output to logic 1, thereby disabling solenoid amplifier X and disengaging the first gear. The logic 0 output from gate 6A is also applied to the PREVENT DOWNSHIFT lead to permit the low speed sensor LSS to initiate a downshift. The logic 0 output from gate 6A is also applied to transistor Q11 of the change speed circuit CS to change the upshift point, or high speed setting of high speed sensor when shifting from first to second, as described hereinafter.

Comparator

The shift comparison logic COMP compares the digitally coded output of shift quadrant GS with the stored count as indicated by the decimal output of the DECODER and prevents an upshift if the gear selected is lower than or equal to the stored count. In other words the comparator prevents the control from upshifting beyond the shift quadrant setting.

For the purpose of indicating the stored count (which represents the output of the control), the outputs of DECODER gates 9A, 9B, 9C and 10A are coupled over leads H, I, J and K to inputs to NAND gates 6B, 6D, 5B and 5D respectively, and the output of DECODER gate 10B is coupled over a lead L to an input of each of NAND gates 5D and 2A. Table 5 shows the state of certain shift comparison logic gates corresponding to DECODER outputs.

TABLE 5

| DECODER GATES | | | | | EN-GAGED GEAR | COMPARATOR GATES | | | | | | |
|---|---|---|---|---|---|---|---|---|---|---|---|---|
| 9A | 9B | 9C | 10A | 10B | | 6C | 5A | 5C | 6B | 6D | 5B | 5D |
| 1 | 1 | 1 | 1 | 1 | Neutral | 1 | 1 | 1 | 0 | 0 | 0 | 0 |
| 1 | 1 | 1 | 1 | 1 | 1 | 1 | 1 | 1 | 0 | 0 | 0 | 0 |
| 0 | 1 | 1 | 1 | 1 | 2 | 1 | 1 | 1 | 1 | 0 | 0 | 0 |
| 1 | 0 | 1 | 1 | 1 | 3 | 0 | 1 | 1 | 1 | 1 | 0 | 0 |
| 1 | 1 | 0 | 1 | 1 | 4 | 0 | 0 | 1 | 1 | 1 | 1 | 0 |
| 1 | 1 | 1 | 0 | 1 | 5 | 0 | 0 | 0 | 1 | 1 | 1 | 1 |
| 1 | 1 | 1 | 1 | 0 | 6 | 0 | 0 | 0 | 1 | 1 | 1 | 1 |

It will be noted that gates 6B, 6D, 5B and 5D change from logic 0 to logic 1 successively as the COUNTER counts up to 1, 2, 3 and 4 in the BCD code on leads Q1, Q2, Q3 and gears 2, 3, 4 and 5 are successively engaged. The outputs of these comparator gates, 6B, 6D, 5B and 5D are coupled to inputs to respective gates 3B, 3C, 2C and 2B which also receive digitally coded inputs from the shift quadrant GS and compare such shift quadrant inputs to the speeds to which the control has shifted, as indicated by the outputs of gates 6B, 6D, 5B and 5D.

Logic 0 output from any one gate 4A, 3B, 3C, 2C or 2B will result in logic 1 output from gate 4C on the PREVENT UPSHIFT lead to thereby prevent the control from shifting up. These gates 4A, 3B, 3C, 2C and 2B respectively receive the two input signals from shift quadrant GS corresponding to selected gears 1, 2, 3, 4 and 5. For example, gate 4A receives input signals B and D for the first gear setting (See Table 2); gate 3B receives input signals B and C for the shift quadrant second speed setting, etc. When the control shifts to the same speed as the shift quadrant is calling for, the output of the corresponding comparator gate will change from logic 1 to logic 0 to thereby provide logic 1 on the PREVENT UPSHIFT lead and prevent an upshift. For example, if shift quadrant GS calls for fourth gear, logic 1 input signals A and D from the shift quadrant will be applied to gate 2C, and the third input to gate 2C from gate 5B will be logic 0 if the control is in third gear or less (See Table 5), thereby providing logic 0 on the PREVENT UPSHIFT lead so the control can shift up. However, if the COUNTER proceeds to binary 110 corresponding to fourth gear, DECODER gate 9C provides logic 0 on lead J, gate 5B in response thereto changes from logic 0 to logic 1 (See Table 5) so that gate 2C receives three logic 1 inputs and provides logic 0 output which results in logic 1 on the PREVENT UPSHIFT lead.

As another example, if shift quadrant GS calls for fifth speed, logic 1 input signals A and C from shift quadrant GS are inputs to gate 2B, and the third input to gate 2B will be logic 0 from gate 5D if the control is in fourth gear or less, thereby providing logic 0 on the PREVENT UPSHIFT lead so the control can shift up. If torque converter speed reaches the high speed setting and the COUNTER increments to binary 001, DECODER gate 10A provides logic 0 on lead K so that solenoid amplifiers U and W are enabled to couple the fifth gear and so that the output of gate 5D changes from logic 0 to logic 1. Gate 2B is now receiving three logic 1 inputs and provides a logic 0 output which results in logic 1 output on the PREVENT UPSHIFT lead to thereby prevent the control from shifting up when shift quadrant GS calls for fifth speed and the control has shifted to fifth gear.

Thus gates 4A, 3B, 3C, 2C and 2B provide logic 0 output respectively when shift quadrant GS calls for first, second, third, fourth and fifth gear and the control shifts up to the corresponding speed. Such logic 0 output from any one gate 4A, 3B, 3C, 2C or 2B prevents the control from shifting up. The outputs of gates 4A, 3B and 3C are inputs to NAND gate 3A so its output is logic 1 whenever any one of 4A, 3B or 3C provide logic 0 output. The outputs of gates 2C and 2B are inputs to NAND gate 2A so its output is logic 1 whenever either 2C or 2B provide logic 0 output. The outputs of gates 3A and 2A are inputs to NOR gate 11A which provides logic 0 output whenever any one of its inputs is logic 1, and this occurs if any one of gates 4A, 3B, 3C, 2C or 2B is logic 0. Such logic 0 from gate 11A is an input to NAND gate 4C and thus provides logic 1 on the PREVENT UPSHIFT lead to prevent an upshift whenever the stored count as indicated by the decimal DECODER output is equal or greater than the gear selected.

When shift quadrant GS is in first, logic 1 signals B and D from the shift quadrant GS are inputs to gate 4A to provide a logic 0 output therefrom which forces gate 4C to logic 1 on the PREVENT UPSHIFT lead, thereby preventing an upshift.

Since sixth gear is the maximum speed, it need not be compared to the shift quadrant output. The output of DECODER gate 10B on lead L is an input to NAND gate 2A. When the COUNTER is incremented to binary 101, DECODER gate 10B provides logic 0 on lead L to enable solenoid amplifiers U and Y and thus couple the sixth gear. The logic 0 on lead L also results in logic 1 output from gate 2A and consequent logic 0 from NOR gate 11A, thereby forcing gate 4A to provide logic 1 on the PREVENT UPSHIFT lead and preventing further upshifting.

Pulse Shape Circuit

The output shaft TCOS of torque converter TC is operatively coupled to a tachometer TACH which generates sine wave signals (not shown) at a frequency proportional to the speed of shaft TCOS over a pair of input leads TA1 and TA2 to the pulse shape circuit PS which converts the low level tachometer signals to rectangular pulses of calibrated height and width. Input leads TA1 and TA2 are coupled to the inverting and noninverting inputs of a pulse sensing high gain operational amplifier OP8 which is provided with a positive feedback resistor R35 to provide some hysteresis around the trigger point. The positive feedback also prevents noise from causing faulty switching inasmuch as a minimum input is required to operate the circuit.

A pair of diodes D14 and D15 connected in opposite polarity across input leads TA1 and TA2 clip the positive half cycles of the tachometer pulses. Amplifier OP8 has its noninverting input biased midway between the +12 volt power supply and ground to float the two amplifier inputs and provide an output of positive half cycles. The square wave pulses from amplifier OP8 are coupled through a capacitance C8 in series with a resistance R37 to the base of a PNP transistor Q7 whose emitter is coupled to the +12 volt power supply. The base of Q7 is coupled through a resistance R38 to ground so that its base-emitter junction is normally forward biased and it conducts and holds off a transistor Q8. When the output of amplifier OP8 switches from logic 0 to logic 1, the potential rises at the base of transistor Q7 so the diode D7 shunting its base-emitter junction conducts, and capacitor C8 discharges through diode D7. The resulting drop across diode D7 reverse biases and turns off transistor Q7, thereby turning on transistor Q8 for the time required to discharge capacitor C8. The output at the collector of transistor Q8 is a positive square wave pulse of approximately 30 microseconds duration which is an input to the high speed sensor HSS to the low speed sensor LSS.

The automatic shifting control uses two shift sensors to regulate shifting, namely, a high speed sensor HSS to detect the torque converter speed required to upshift transmission TR, i.e., the high speed limit, and a low speed sensor LSS which detects the torque converter speed at which a downshift occurs, i.e., the low speed limit. The high speed sensor normally applied logic 0 on the UP/DOWN lead to the COUNTER so that the COUNTER is always set for a downshift unless the torque converter speed exceeds the high speed setting and the high speed sensor flip flop HSFF provides logic 1 on the UP/DOWN lead so the COUNTER can be incremented. No shift can occur unless the TIMER is started and times out to apply a shift pulse to the COUNTER. The TIMER is started when the high speed sensor flip flop HSFF applies logic 0 to the UP lead to the UP/DOWN circuit or the low speed sensor flip flop LSFF applies logic 0 on the DOWN lead to the UP/DOWN circuit.

Low Speed Sensor

The positive square wave tachometer, or speed sensor pulses derived at the collector of transistor Q8 are applied to the base of an NPN transistor Q9 of the low speed sensor and turn it on to discharge a time base capacitor C9. Capacitor C9 is connected across the emitter-collector circuit of transistor Q9 and is charged, in the interval between speed sensor pulses, from the +12 volt power source through a resistance R46 so that a ramp voltage builds up across capacitor C9 until a positive square wave pulse turns on transistor Q9 to discharge capacitor C9. The ramp voltage built up across capacitor C9 is applied to the inverting input of an operational voltage comparator amplifier OP2 which compares this ramp voltage to a positive predetermined reference voltage applied to the noninverting input of amplifier OP2 and derived at the junction of two resistances R47 and R49 comprising a voltage divider connected between the +12 volt power supply and ground. The output of amplifier OP2 is normally high, or logic 1, until a sufficiently high positive voltage is built up across capacitor C9 and applied to its inverting input to flip its output negative, or logic 0.

If the speed of the torque converter is low, the pulse rate from tachometer TACH will be low, and capacitor C9 will charge to a relatively high voltage before being discharged when transistor Q9 is turned on by a tachometer pulse. When the speed of torque converter TC is at or below the low speed setting at which it is desired that transmission TR shift down, the ramp voltage builds up across capacitor C9 in the interval between tachometer pulses to a value higher than the reference value applied to the noninverting input of amplifier OP2, thereby flipping the output of amplifier OP2 to a low level, logic 0 voltage. The logic 0 output from amplifier OP2 is applied to the D (DATA) input of a type D flip-flop LSSF of the low speed sensor LSS which is used to remember the output of amplifier OP2. Flip-flop LSFF also receives the tachometer pulse from the pulse shape circuit PS on its C (CLOCK) input and, on the rising edge of the tachometer pulse, will transfer the logic 0 voltage level at its D input to its Q output on the DOWN lead and hold it until the next tachometer pulse. If the OP2 amplifier output has switched to a low, logic 0 level at the start of a tachometer pulse, logic 0 appears at the Q output of flip-flop LSFF on the DOWN lead to the UP/DOWN circuit, thereby indicating the need to start the TIMER for a downshift of transmission TR. The logic 0 on the DOWN lead from flip-flop LSFF provides logic 1 output from NAND gate 8D of the UP/DOWN control which starts the TIMER. After a time delay, the TIMER applies a shift pulse to the CLOCK input of the COUNTER to decrement the COUNTER and thus shift transmission TR down.

When the tachometer pulses occur more often than the predetermined low frequency (low speed setting) at which it is desired that transmission TR shift down, the positive reference voltage on the noninverting input of amplifier OP2 provides a positive (logic 1) output from amplifier OP2 on the D (DATA) input of flip-flop LSFF, thereby providing logic 1 on its Q output when a tachometer pulse is applied to its C (CLOCK) input. The logic 1 on the Q output of flip-flop LSFF is normally applied to the DOWN lead which is coupled to an input of NAND gate 8D of the UP/DOWN control so that the TIMER is disabled but can be started by the high speed sensor HSS. Stated another way, if the output of amplifier OP2 is logic 1, it indicates that the vehicle speed is high enough so that a downshift of transmission TR is unnecessary.

High Speed Sensor

The high speed sensor HSS operates in a manner analogous to the low speed sensor LSS. The square wave pulses from the pulse shape circuit PS are applied to the base of an NPN transistor Q10 and turn it on. A time base capacitor C12 connected across the emitter-collector circuit of transistor Q10 is charged, in the interval between tachometer pulses, from the +12 volt power source through two series resistors R44 and R45 so that a ramp voltage builds up across capacitor C12, and capacitor C12 is discharged each time a tachometer pulse turns transistor Q10 on. The ramp voltage across capacitor C12 is coupled to the inverting input of an operational voltage comparison amplifier OP1 whose noninverting input is coupled to a reference voltage derived at the junction of two series resistances R50 and R52 forming a voltage divider between the +12 volt source and ground. The output of amplifier OP1 is applied to the D (DATA) input of a type D flip-flop HSFF of the high speed sensor HSS which receives the square wave tachometer pulses on its C (CLOCK) input. Flip-flop HSFF remembers the output from amplifier OP1.

When the torque converter speed is low so that the tachometer pulse frequency is below the high speed setting at which an upshift should occur, the ramp voltage builds up across capacitor C12 to a sufficient magnitude in the interval between tachometer pulses to overcome the reference voltage applied to the noninverting input of amplifier OP1 and flip its output to a low, logic 0 voltage which is coupled to the D input of flip-flop HSFF. This logic 0 on the D input of flip-flop HSFF is transferred to its Q output on the rising edge of a tachometer pulse applied to the C input of flip-flop HSFF. The logic 0 on the Q output of flip-flop HSFF is coupled to the UP/DOWN lead to the COUNTER so the COUNTER is set for a downshift, and the logic 1 on the $\overline{Q}$ output of flip-flop HSFF is applied to the UP lead to permit the low speed sensor to start the TIMER.

When the torque converter speed is high, the tachometer pulse rate is also high, capacitor C12 is discharged often, and the reference voltage applied to the noninverting input of amplifier OP1 maintains the amplifier output at logic 1. When the tachometer pulse frequency is above the high speed setting, the logic 1 output from amplifier OP1 is applied to the D input of flip-flop HSFF and transferred to its Q output when a tachometer pulse is applied to its C input. The logic 1 on the Q output of flip-flop HSFF is coupled to the UP/DOWN lead to the COUNTER so that the COUNTER can proceed forward, and the logic 0 on the $\overline{Q}$ output of flip-flop HSFF is applied to the UP lead to the UP/DOWN control to start the TIMER.

Up/Down Control

When an upshift is required, the output of flip-flop HSFF of the high speed sensor provides the logic 1 signal on its Q output and thus on the UP/DOWN lead to increment the COUNTER and also provides a logic 0 on its $\overline{Q}$ output and the UP lead to start the TIMER. The TIMER is started when the output of NAND gate 8D of the UP/DOWN circuit changes from logic 0 to logic 1. Low speed sensor flip-flop LSFF normally maintains logic 1 on the DOWN lead to gate 8D and only provides logic 0 to gate 8D to start the TIMER when a downshift is required. Consequently, the COUNTER is always set for downshift unless an upshift is being called for by the high speed sensor. When flip-flop HSFF of the high speed sensor provides logic 0 on its $\overline{Q}$ output to provide a logic 1 output from gate 8D to start the TIMER, it also provides logic 1 on its Q output and the UP/DOWN lead to increment the COUNTER. At all other times, flip-flop HSFF provides logic 0 on its Q output and the UP/DOWN lead so the COUNTER is on the downshift mode.

Speed Change Circuit

The control operates in the torque converter mode when in first gear, and the high speed setting which the tachometer pulse frequency must reach to shift the control up is lower in first gear than when a gear 2–5 is engaged in order to compensate for slippage in torque converter TC. When in first gear, the control preferably accomplishes a shift when the torque converter output shift speed is approximately 1925 rpm and, when in a gear 2–5, shifts up at a speed of approximately 2080 rpm.

Resistance R44 of the high speed sensor is shunted by the emitter-collector circuit of a transistor Q11 whose base is coupled to the output of first speed logic gate 6A and the PREVENT DOWNSHIFT lead. The output of gate 6A is logic 1 when the control is in neutral or first gear, and such logic 1 reverse biases and turns off transistor Q11 so that the RC time constant and the time required to charge capacitor C12 through resistance R44 and R45 in series is high. When the control is in first gear, the torque converter speed must reach 1925 rpm to short capacitor C12 sufficiently frequently so that the output of amplifier OP1 remains logic 1, which is necessary to effect an upshift. When the control shifts to second or above, the logic 0 from DECODER gate 9A on lead H converts the output of gate 6B to logic 1 so that the output of gate 6A on the PREVENT DOWNSHIFT lead goes to logic 0 to forward bias and turn on transistor Q11, thereby shorting resistance R44 and decreasing the RC time constant for capacitor C12. In summary, when the control is second or higher, transistor Q11 is turned on, thereby shorting resistance R44 and requiring a higher torque converter speed to accomplish an upshift.

Timer

The TIMER provides a pulse of 40 milliseconds calibrated width to shift the COUNTER and to release all transmission solenoids during a shift in order to prevent overlap between speed ranges. Also, to prevent noise and sudden speed changes from causing erratic shifting, the TIMER requires that a start signal from the high speed sensor HSS or from the low speed sensor LSS be present for one second before a shift pulse is generated. The time delay assures that a shift has been completed before allowing another and also allows the shaft to stabilize between shifts before sampling speed for another shift.

The output from NAND gate 8D of the UP/DOWN circuit is an input to a NAND gate 10C of the TIMER and is normally logic 0 so that the output of gate 10C is logic 1 when the circuit is not timing. The output of gate 10C is applied through two series resistances R61 and R62 to one electrode of a capacitor C18, and the junction of resistances R61 and R62 is coupled to the base of NPN transistor Q13 so that base current normally flows through R61 and keeps Q13 turned on. A timing capacitor C20 shunted across the emitter-collector circuit of transistor Q13 may be charged from the +12 volt power supply through a resistance R63 but is held discharged by the normally conducting transistor Q13. The voltage across capacitor C20 is connected to the inverting input of an operational voltage comparator amplifier OP4 whose noninverting input is coupled to a reference voltage at the junction of two series resistances R64 and R65 of a voltage divider between the power supply and ground so that the output of amplifier OP4 is normally logic 1. The output of amplifier OP4 is applied to an input of gate 10C, to one electrode of capacitor C18, and also to the input of a NOT gate 4D which inverts the shift pulse and whose normal logic 0 output is coupled to the C (clock) input of the COUNTER. Capacitor C18 charges to the same voltage as the output of amplifier OP4.

When a gear shift is required, either flip-flop HSFF of the high speed sensor applies logic 0 to the UP lead or flip-flop LSFF of the low speed sensor applies logic 0 to the DOWN lead, thereby changing the output of gate 8D of the UP/DOWN circuit to logic 1. The logic 1 from gate 8D switches NAND gate 10C to logic 0 (since another input from amplifier OP4 is also logic 1). The logic 0 from gate 10C turns off transistor Q13 so timing capacitor C20 will start to charge. After approximately one second, the voltage across capacitor C20 applied to the inverting input of amplifier OP4 will overcome the positive reference voltage coupled to its noninverting input, and the output of amplifier OP4 will switch to logic 0 to initiate the shift pulse. The logic 0 shift pulse from amplifier OP4 is coupled to DECODER gates 9A–10B and to first speed logic gate 7C so their outputs go to logic 1, thereby releasing all transmission solenoids in order to prevent overlap between speed ranges. The logic 0 shift pulse from amplifier OP4 is inverted to logic 1 by NOT gate 4D and coupled to the COUNTER so that it increments or decrements in accordance with the logic signal on the UP/DOWN lead. The logic 1 shift pulse from NOT gate 4D is also applied to one input of neutral logic NOR gate 1A so that its output remains logic 0 in order to prevent the control from shifting to neutral during a gear shift when shift quandrant GS is in neutral and the DECODER output is in second through sixth.

Inasmuch as amplifier OP4 output switched to logic 0 at the start of the shift pulse, gate 10C will switch to logic 1. Capacitor C18 will then discharge through R62 and R61 since logic 0 from amplifier OP4 is applied to one electrode and gate 10C has switched to logic 1. The flow of discharge current through R62 will keep transistor Q13 off for approximately 0.04 seconds, and the shift pulse is thus approximately 40 milliseconds wide to prevent overlap between speed ranges. After approximately 40 milliseconds, transistor Q13 turns on and discharges timing capacitor C20, thereby resetting the output of amplifier OP4 back to logic 1 and ending the shift pulse.

Auxiliary Circuits

A fail-safe logic circuit FS including NAND gates 7B and 8C and a NOR gate 1B receives inputs from a zero speed tachometer ZST, from a pressure sensor PSS of torque convertor fluid pressure, and from a SHIFT HOLD switch. The fail-safe logic circuit FS operates the control directly to neutral under certain conditions and prevents shifting under other conditions. NOR gate 1B is used to prevent shifting. The output of gate 1B is coupled to gate 10C of the TIMER, and anytime the output of gate 1B is logic 0, the output of gate 10C is logic 1 to thereby lock out the TIMER and prevent shifting.

Shift Hold

A normally closed SHIFT HOLD switch normally applies logic 0 (ground) potential to one input of NOR gate 1B so its output is logic 1 and the TIMER can operate when the switch is not operated. This same input of NOR gate 1B is also coupled through a resistance R58 to the +12 volt power supply, but the logic 0 ground signal through the SHIFT HOLD switch holds the output of gate 1B at logic 1.

In order to prevent shifting, the SHIFT HOLD switch is operated to open its contacts, thereby applying logic 1 through resistance R58 to gate 1B and changing its output to logic 0 to lock out the TIMER. The SHIFT HOLD switch permits the operator to lock the control in a particular operating speed and preferably is used during loading when a very low gear speed may undesirably cause spin of the vehicle wheels VW. The higher gear setting selected by the operator through the SHIFT HOLD switch may reduce power to the ground but does prevent excessive speed of vehicle wheels VW.

Zero Speed Tachometer

Another input to NOR gate 1B is from the zero speed tachometer ZST which prevents shifting of transmission TR if a failure occurs in the speed sensor.

The positive square wave tachometer pulses of 30 microsecond duration from the pulse shape circuit PS derived at the collector of transistor Q8 are coupled to the base of an NPN transistor Q12 which is turned on by each pulse. A capacitor C16 connected in shunt to the emitter-collector circuit of transistor Q12 is charged from the +12 volt power supply through a resistance R57 and is discharged each time transistor Q12 is turned on by a tachometer pulse. The voltage across capacitor C16 is applied to: (a) an input of NAND gate 7B whose output is coupled to an input of gate 8B of the first speed logic circuit, and (b) an input of NOR gate 1B.

At high pulse rates capacitor C16 is discharged often, and the voltage across capacitor C16 will be low, or logic 0. At low vehicle speeds the rate of tachometer pulses will be low, and capacitor C16 will charge to logic 1 voltage, thereby indicating a low or zero speed of the machine. The logic 1 across capacitor C16 at zero vehicle speed provides logic 0 output from NOR gate 1B, thereby locking out the TIMER and preventing any shifting of transmission TR. In the event of tachometer failure, the control will prevent shifting up or down until the vehicle is stopped. The control is locked in the speed which it was in at the time of tachometer failure. When the vehicle is stopped, the pressure switch PSS which senses torque converter fluid pressure operates the fail-safe circuit FS to switch the control to neutral, and the control will stay in neutral since the zero speed tachometer ZST prevents shifting if tachometer pulses are not present.

If the vehicle is brought to such an abrupt stop that the control does not have time to shift successively from gear-to-gear down to first, an interlock including gate 7B and 8C senses this condition and shifts the control directly to neutral and then to first gear. If the vehicle were abruptly halted while fifth or sixth gear is engaged, transmission TR might be damaged during the time interval required to shift to neutral through each successively lower speed ratio gear with the one second time delay for each shift provided by the TIMER. The fail-safe interlock is responsive to the simultaneous disappearance of both tachometer pulses and torque converter fluid pressure to allow the control to shift from second, third, fourth, fifth or sixth directly to neutral.

The output of gate 7B is coupled to an input to gate 8C, and the output of gate 8C is coupled to an input to gate 7B. A normally closed pressure switch PSS applies ground (logic 0) to an input of NAND gate 8C when the prime mover PM is idling, but is operated to open position when the torque converter is being driven and its fluid pressure is above a preselected value to thereby remove the ground (logic 0) signal. This input of gate 8C is also coupled to the +12 volt power supply through a resistance R53 and a diode D8 so logic 1 is applied thereto when the pressure switch PSS opens.

When the vehicle is stopped abruptly and tachometer pulses cease, the zero speed tachometer ZST applies logic 1 derived across capacitor C16 to an input to NAND gate 7B and also to an input to NOR gate 1B. When torque converter fluid pressure disappears, the pressure switch PSS closes to apply logic 0 to gate 8C and change its output to logic 1. All inputs to NAND gate 7B are now logic 1 so it provides a logic 0 output to gate 8B which applies logic 1 to gate 8A. The resulting logic 0 from gate 8A provides logic 1 from first speed coupling gate 7C to disable solenoid amplifiers V and X and thereby disengage the first gear. The logic 1 from gate 8B is also applied to the RESET input to the COUNTER, thereby setting all of its output Q1, Q2, and Q3 to logic 1, the outputs of all DECODER gates 9A–10B to logic 1, and releasing all gear solenoids so transmission TR jumps directly into neutral.

If the control is in neutral, the torque converter shaft TCOS can spin, tachometer pulses reappear on leads TA1 and TA2, and the output of zero speed tachometer ZST derived across capacitor C16 goes to logic 0 because C16 is being discharged often. The logic 0 from the zero speed tachometer ZST provides logic 1 from gate 7B, logic 0 from 8B, logic 1 from gate 8A, and logic 0 from gate 7C to activate solenoid amplifiers V and W and thereby energize output leads B' and D' to shift transmission TR to first. In the event of speed sensor failure, the output of gate 7B will remain logic 0 so the control remains in neutral.

In the event of failure of the torque converter fluid pressure sensor PSS, the control is required to downshift to first and will not jump from a higher speed to first. If pressure switch PSS fails, the output of gate 8C will go to logic 1 which is applied to an input of gate 7B. However, if the tachometer pulses do not disappear, logic 0 from capacitor C16 of the zero speed tachometer ZST will remain on one input of gate 7B so its output remains logic 1. Consequently, the control will not jump from a higher speed to first. The logic 1 from gate 7B is an input to gate 8C so its output is logic 0 which is an input to gate 1B. In this condition, the output of NOR gate 1B is logic 1 which permits the TIMER to operate and the control to shift down successively from gear to gear to first speed.

While only a single embodiment of our invention has been illustrated and described, many modifications and variations thereof will be readily apparent to those skilled in the art, and consequently it should be understood that we do not intend to be limited to the particular embodiment shown and described.

The embodiments of the invention in which an exclusive property or privilege are claimed are defined as follows:

1. In combination with a gear selector which provides digitally coded electrical signals representative of desired speed and a change-speed transmission which engages selected gears to provide different speed ratio power paths between input and output shafts in accordance with digitally encoded electrical signals applied to inputs thereof, a digital control for automatically shifting said transmission comprising tachometer means for generating pulses at a frequency which is a function of the angular velocity of said transmission input shaft, an up-down counter, high speed sensor means and low speed sensor means operable respectively when the frequency of said tachometer pulses is above a first predetermined rate and below a second predetermined rate, means responsive to the operation of said high speed sensor means and to the operation of said low speed means sensor respectively for incrementing and decrementing said counter, means for generating digitally coded signals representative of the count stored in said counter and for applying them to the inputs to said transmission so that said transmission engages the gear corresponding to the count stored in said counter, and comparator means for comparing the speed set on said gear selector, as indicated by the digitally coded electrical output signals therefrom, to the count stored in said counter and for disabling said high speed sensor means when the former is equal to or less than the latter, whereby said control cannot shift to a gear above the setting of said gear selector.

2. In the combination of claim 1 wherein said counter proceeds one count upon receipt of a shift pulse, and said means for incrementing and decrementing said counter includes timer means (10C, Q13, C20, OP4) adapted when triggered for a preselected time interval to apply a shift pulse to said counter, and also including up/down means responsive to the operation of said high speed sensor means or to the operation of said low speed sensor means for triggering said timer means.

3. In the combination of claim 2 wherein said counter is adapted to be incremented and decremented respectively upon receipt of an up signal and a down signal, and wherein said high speed sensor means includes a bistable flip-flop (HSFF) which is held in a first state wherein it applies a down signal to said counter when said high speed sensor means is disabled and is switched to a second state when said high speed sensor means is operated wherein it removes said down signal and applies an up signal to said counter and also derives a signal to operate said up/down means.

4. In the combination of claim 3 wherein said high speed sensor means also includes an RC timing circuit including a time base capacitor (C12), a transistor (Q10) having its emitter-collector circuit in shunt to said capacitor and its base coupled to said tachometer means so that said transistor is turned on by each tachometer pulse to discharge said capacitor, and a voltage comparator amplifier (OP1) having inverting and noninverting inputs one of which receives the voltage across said capacitor (C12) as one input and the other of which is coupled to a bias source, said high speed sensor flip-flop (HSFF) being controlled by the output of said voltage comparator amplifier.

5. In the combination of claim 3 and including neutral sense means (1A, 4B) responsive to the output of said gear selector for providing a neutral position signal when said gear selector is set to neutral, and prevent upshift means (4C) responsive to said neutral position signal to disable said high speed sensor flip-flop and thereby prevent an upshift of said transmission when said gear selector is set to neutral.

6. In the combination of claim 5 and including counter controlling means (7A, 8B) responsive to the concurrent presence of said neutral position signal and to zero count and a count greater than zero being stored in said counter respectively for disabling and enabling said counter.

7. In the combination of claim 6 and including first gear coupling means (7C, V, X) for applying digitally coded signals to said transmission to couple the first transmission gear, first speed sensing means (7A) receiving said gear selector signals as inputs and operable when said gear selector is set to first speed, and means (8B, 8A) responsive to operation of said first speed sensing means for actuating said first gear coupling means.

8. In the combination of claim 7 wherein said counter controlling means is responsive to operation of said first speed sensing means to enable said counter, and said prevent upshift means is responsive to operation of said first speed sensing means to enable said high speed sensor flip-flop.

9. In the combination of claim 7 and including means (6B, 6A) for disabling said first gear coupling means when the count stored in said counter is greater than zero.

10. In the combination of claim 7 and including change speed means (6A, Q11) controlled by the output of said counter for increasing said first predetermined rate of tachometer pulses at which an upshift of said transmission occurs to a higher value when said counter stores a count greater than zero.

11. In the combination of claim 7 and including zero speed tachometer means (Q12, C16) coupled to said tachometer means and operable when the frequency of said tachometer pulses is below a third predetermined rate, and means (1B) controlled by said zero speed tachometer means for disabling said timer means to thereby prevent shifting up or down and lock the transmission in the then-engaged gear.

12. In the combination of claim 11 wherein the input shaft of said transmission is driven by a fluid-filled torque converter, and including a pressure sensor operable when the pressure of the fluid in said torque converter drops below a preselected value, and quick downshift means (8C, 7B, 8B) responsive to the simultaneous operation of said zero speed tachometer means and of said pressure sensor for resetting said counter to zero and for disabling said first gear coupling means, whereby said transmission is shifted directly to neutral if the machine driven by said transmission is stopped abruptly.

13. In the combination of claim 12 wherein said quick downshift means operates said first gear coupling means in response to the subsequent enabling of said zero speed tachometer means when said input shaft again turns and tachometer pulses reappear.

14. In the combination of claim 3 wherein said gear selector provides a multi-digit output code and said counter can proceed to a count corresponding to the speed set on said gear selector, said comparator means includes a plurality of multi-input NAND logic gates (4A, 3B, 3C, 2C, 2B) each of which corresponds to a respective speed setting of said gear selector and receives as inputs digits of the gear selector output for the corresponding setting of said gear selector, stored count indicating means (6B, 6D, 5B, 5D) for applying logic signal inputs to said multi-input NAND logic gates successively as said counter proceeds forward from zero so that said NAND gates are respectively enabled when inputs thereto for a given gear selector occur simultaneously with the input thereto from said stored count indicating means for the corresponding or a higher count stored in said counter, and means (3A, 2A, 11A 4C) responsive to the enabling of any said NAND gate for disabling said high speed sensor flip-flop.

15. In the combination of claim 2 and including means triggered by each said shift pulse for removing said digitally coded input signals to said transmission for a time interval to thereby release the electrically energized gear coupling means in the transmission and prevent overlap during shifting.

16. In combination with a change-speed transmission which engages selected gears to provide different speed ratio power paths between input and output shafts in accordance with digitally encoded electrical signals applied to inputs thereof and a gear selector which provides digitally encoded electrical signals representative of desired speed, a digital control for automatically shifting said transmission comprising tachometer means for generating pulses at a frequency which is a function of the rpm of the transmission input shaft, an up-down counter adapted to be incremented and decremented upon receipt of up and down directional signals respectively and to proceed to count upon receipt of a shift pulse, a timer (10C, Q13, C20, OP4) adapted when triggered for a predetermined time interval to apply a shift pulse to said counter, high speed sensor means (Q10, C12, OP1) and low speed sensor means (Q9, C9, OP2) for sensing when the frequency of said tachometer pulses is respectively above a first predetermined rate and below a second predetermined rate, one of said speed sensor means normally supplying one of said directional signals to said counter and being adapted when operated to supply the opposite directional signal to said counter, up/down means (8D) responsive to the output of said high speed sensor means or of said low speed sensor means for triggering said timer, means (DECODER, U, V, W, X, Y) coupled to the output of said counter for generating digitally coded signals representative of the count stored in said counter and for applying them to the input to said transmission so that said transmission shifts to the gear corresponding to the count stored in said counter, and comparator means for comparing the speed set on said gear selector, as indicated by the digitally coded electrical signals therefrom, to the count stored in said counter and for disabling said high speed sensor means when the former is equal to or less than the latter, whereby said control cannot shift to a gear above the setting of said gear selector.

17. In the combination of claim 16 and including neutral sense means (1A, 4B) receiving the output from said gear selector for providing a neutral position signal when said gear selector is set to zero speed, and prevent upshift means (4C) controlled by said neutral position signal for disabling said high speed sensor means to thereby prevent an upshift of said transmission when said gear selector is set to zero speed.

18. In the combination of claim 17 and including counter controlling means (7A, 8B) responsive to the concurrent presence of said neutral position signal and to zero count and a count greater than zero being stored in said counter respectively for disabling and enabling said counter.

19. In the combination of claim 17 and including first gear coupling means (7C, V, X) for applying digitally coded signals to inputs to said transmission to couple the first transmission gear, first speed sensing means (7A) receiving the digitally coded output signals from said gear selector and being operable when it is set to first speed, and means (8B, 8A) responsive to operation of said first speed sensing means for actuating said first gear coupling means.

20. In the combination of claim 19 wherein said counter controlling means is responsive to operation of said first speed sensing means to enable said counter, and said prevent upshift means is responsive to operation of said first speed sensing means to enable said high speed sensor means.

21. In the combination of claim 19 and including means (6A) controlled by said comparator means (6B) for disabling said first gear coupling means (7C, V, X) when the count stored in said counter is greater than zero.

22. In the combination of claim 16 wherein said gear selector provides a multi-digit output code, said comparator means includes a plurality of multi-input logic gates (4A, 3B, 3C, 2C, 2B) which respectively receive as inputs digits of the gear selector output code which are energized when said gear selector is adjusted to successive speed settings, stored count indicating means (6B, 6D, 5B, 5D) coupled to the output of said counter for applying logic signals successively to inputs of said logic gates indicative of the count stored in said counter, said multi-input logic gates being respectively enabled when inputs thereto for a given gear selector speed setting occur simultaneously with the logic signal inputs thereto from said stored count indicating means for the corresponding or higher count stored in said counter, and prevent upshift means (3A, 2A, 11A, 4C) responsive to the enabling of any one of said logic gates for disabling said high speed sensor means.

23. In the combination of claim 16 wherein said means for applying digitally coded signals to the inputs of said transmission includes a decoder (11C, 11B, 9A, 9B, 9C, 10A, 10B) coupled to the output of said counter and means for amplifying the output signals from said decoder.

24. In the combination of claim 23 wherein said counter is binary, said decoder converts the binary output of said counter to decimal, and said comparator means compares the speed set on said gear selector to the stored count indicated by the decimal output of said decoder.

25. In the combination of claim 16 and including change speed means (6A, Q11) controlled by the output of said counter for decreasing said first predetermined rate of tachometer pulse frequency when zero count is stored in said counter and said transmission is in neutral or first gear.

26. In the combination of claim 19 and including zero speed tachometer means (Q12, C16) operable when the frequency of said tachometer pulses is below a third predetermined rate, and means (1B) controlled by said zero speed tachometer means for disabling said timer to thereby prevent shifting up or down and lock the transmission in the then-engaged gear.

27. In the combination of claim 16 and including selectively operable shift hold means (SHIFT HOLD, 1B) for disabling said timer to thereby prevent shifting of said transmission.

28. In the combination of claim 26 and including a fluid-filled torque converter coupled to said transmission input shaft, a pressure sensor operable when the pressure of the fluid in said torque converter drops below a preselected value, and quick downshift means (8C, 7B, 8B) for resetting said counter to zero and for disabling said first gear coupling means to thereby shift said transmission directly to neutral in response to the simultaneous operation of said zero speed tachometer means and operation of said pressure sensor.

29. In the combination of claim 28 wherein said quick downshift means is adapted to operate said first gear coupling means in response to the subsequent enabling of said zero speed tachometer means when said pulse tachometer frequency again rises above said third predetermined rate.

30. In the combination of claim 16 and including means triggered by each said shift pulse for removing said digitally coded input signals to said transmission for a time interval to thereby release the electrically energized gear coupling means in the transmission and prevent overlap between transmission gears during shifting.

31. In the combination of claim 16 wherein said high speed sensor means includes
an RC timing circuit including a time base capacitor,
a transistor (Q10) having its emitter-collector circuit in shunt to said capacitor and connected to be turned on by each tachometer pulse to discharge said capacitor, and
bistable means receiving the voltage across said capacitor as an input and being in a first state when the voltage across said capacitor exceeds a preselected magnitude and being switchable to a second state wherein it applies a signal to said up/down means to trigger said timer when the voltage across said capacitor drops below said preselected magnitude, whereby said timer is triggered when the transmission input shaft speed exceeds a predetermined rpm.

32. In the combination of claim 31 wherein said counter is incremented and decremented in response to a shift pulse when an up signal and a down signal respectively is applied to said counter, and wherein said bistable means includes a voltage comparator amplifier (OP1) having inverting and noninverting inputs one of which receives the voltage across said capacitor as an input and the other of which is biased to a fixed potential, and said bistable means also includes a bistable flip-flop (HSFF) switchable between a first state wherein it applies a down signal to said counter and a second state wherein it applies an up signal to said counter and also applies a signal to said up/down means to trigger said timer, said bistable flip-flop being controlled by the output of said voltage comparator amplifier.

33. In the combination of claim 30 and including change speed means (Q11, 6A) controlled by said comparator means (6B) for increasing the resistance (R44, R45) in said high speed sensor timing circuit (C12, R44, R45) when said counter proceeds forward from zero count to thereby increase said first predetermined rate of tachometer pulse frequency at which an upshift occurs.

34. In the combination of claim 32 wherein said comparator means disables said high speed sensor flip-flop to prevent an upshift of said transmission when the output of said gear selector is equal to or less than the count stored in said up-down counter.

35. In the combination of claim 16 wherein said timer includes
a NAND logic gate (10C) adapted to receive a triggering input signal from said up/down means,
an RC timing circuit including a capacitor (C20),
a transistor (Q13) having its emitter-collector circuit in shunt to said timing circuit capacitor and its base coupled to and normally forward biased by the output of said NAND gate so that said capacitor is normally discharged, and
a voltage comparator amplifier (OP4) having inverting and noninverting inputs one of which receives the voltage across said timing circuit capacitor as an input and the other of which is biased at a fixed potential and whose output is coupled to said counter, whereby said voltage comparator amplifier will switch states to initiate said shift pulse after said timing capacitor charges for said predetermined time interval to a preselected voltage.

36. In the combination of claim 35 wherein the output of said voltage comparator amplifier is an input to said NAND gate so that said NAND gate is reset to its normal state when said shift pulse is initiated, and
means including a second RC timing circuit (R62, C18) coupled to the output of said voltage comparator amplifier and to the base of said transistor (Q13) for maintaining said transistor (Q13) turned off for a preselected time interval after said NAND gate is reset to thereby generate said shift pulse.

37. In combination with a gear selector which provides digitally coded electrical signals indicative of selected speed and an electromagnetically operated change-speed transmission which couples selected gears to provide different speed ratio power paths between input and output shifts in accordance with digitally encoded signals applied to inputs thereof, a control for automatically shifting said transmission comprising
an up-down counter adapted to be incremented and decremented respectively upon receipt of up input signals and down input signals and to proceed to count upon receipt of a shift pulse,
a decoder coupled to the output of said counter,
means including a plurality of power amplifiers coupled to the output of said decoder for generating digitally coded signals representative of the count indicated by said decoder and for applying them to inputs to said transmission so that it shifts to the gear corresponding to the count indicated by said decoder,
tachometer means for generating pulses at a frequency which is a function of the angular velocity of said transmission input shaft, timer means adapted when triggered for a predetermined time interval to apply a shift pulse to said counter and to reset itself, high speed sensor means coupled to said tachometer means and normally applying said down signal to said counter and being operable to apply said up signal to said counter when the frequency of said tachometer pulses exceeds a first predetermined magnitude, low speed sensor means coupled to the output of said tachometer means and being operable when the frequency of said tachometer pulses drops below a second predetermined magnitude, up/down means responsive to the operation of said high speed sensor means or the operation of said low speed sensor means for triggering said timer means, and shift comparison means including a plurality of multi-input logic gates (4A, 3B, 3C, 2C, 2A) each of which corresponds to a respective setting of said gear selector and receives as inputs digits of the gear selector output for the corresponding setting for comparing the speed set on said gear selector to the stored count indicated by said decoder and for disabling said high speed sensor when the latter is equal to or greater than the former, whereby said control cannot shift up to a gear higher than the speed setting of said gear selector, said shift comparison means including stored count indicating means (6B, 6D, 5B, 5D) coupled to said decoder for applying signals to inputs of said multi-input logic gates successively indicative of the count represented by said decoder.

* * * * *

UNITED STATES PATENT OFFICE
CERTIFICATE OF CORRECTION

Patent No. 3,961,546    Dated June 8, 1976

Inventor(s) Thomas P. Gilmore and David L. Moore

It is certified that error appears in the above-identified patent and that said Letters Patent are hereby corrected as shown below:

Column 21, Line 8 --- setting --- was omitted after selector;

Column 26, Line 12 --- also --- was omitted after means

Signed and Sealed this

Ninth Day of November 1976

[SEAL]

Attest:

RUTH C. MASON
Attesting Officer

C. MARSHALL DANN
Commissioner of Patents and Trademarks